United States Patent
Steudler, Jr. et al.

(10) Patent No.: US 6,655,317 B1
(45) Date of Patent: Dec. 2, 2003

(54) ADJUSTABLE POULTRY FEEDER

(75) Inventors: Frederick W. Steudler, Jr., Conestoga, PA (US); Jeremy L. Parsons, Ephrata, PA (US)

(73) Assignee: Val Products, Inc., Bird-In-Hand, PA (US)

( * ) Notice: Subject to any disclaimer, the term of this patent is extended or adjusted under 35 U.S.C. 154(b) by 0 days.

(21) Appl. No.: 10/284,405

(22) Filed: Oct. 31, 2002

(51) Int. Cl.$^7$ .................. A01K 39/012; A01K 39/01
(52) U.S. Cl. ........................... 119/53; 119/57.4
(58) Field of Search .................. 119/53, 57.1, 57.2, 119/57.4, 57.92

(56) References Cited

U.S. PATENT DOCUMENTS

| | | |
|---|---|---|
| 985,201 A | 2/1911 | Owens |
| 2,808,028 A | 10/1957 | Landgraf et al. |
| 3,012,539 A | 12/1961 | Warren |
| 3,203,397 A | 8/1965 | Henry |
| 3,388,690 A | 6/1968 | Hostetler |
| 3,490,419 A | 1/1970 | Van Huis |
| 3,511,215 A | 5/1970 | Myers |
| 3,566,843 A | 3/1971 | Van Huis et al. ............. 119/53 |
| 3,811,412 A | 5/1974 | Murto et al. ................. 119/53 |
| 3,827,405 A | 8/1974 | Allen ........................ 119/53 |
| 3,911,868 A | 10/1975 | Brembeck .................... 119/53 |
| 4,070,990 A | 1/1978 | Swartzendruber ............. 119/53 |
| 4,476,811 A | 10/1984 | Swartzendruber ............. 119/52 |
| 4,527,513 A | 7/1985 | Hart et al. ................. 119/51.5 |
| 4,834,026 A | 5/1989 | Brembeck et al. ............ 119/53 |
| 4,947,798 A | 8/1990 | De Wispelaere .............. 119/53 |
| 4,995,343 A * | 2/1991 | Cole et al. .................. 119/53 |
| 5,007,380 A | 4/1991 | Badia et al. ................. 119/53 |
| D321,959 S | 11/1991 | Cole et al. ................. D30/121 |
| 5,092,274 A | 3/1992 | Cole et al. ................. 119/57.4 |
| 5,097,797 A | 3/1992 | Van Zee et al. ............. 119/57.4 |
| 5,101,766 A | 4/1992 | Runion ....................... 119/53 |
| 5,113,797 A | 5/1992 | van Daele .................... 119/53 |
| 5,406,907 A | 4/1995 | Hart .......................... 119/53 |
| 5,497,730 A | 3/1996 | van Daele et al. ............ 119/53 |
| 5,517,944 A | 5/1996 | Bate et al. .................. 119/53 |
| 5,718,187 A | 2/1998 | Pollock et al. ............. 119/52.4 |
| 5,762,021 A | 6/1998 | Horwood et al. ........... 119/57.4 |
| 5,765,503 A | 6/1998 | van Daele ................. 119/52.4 |
| 5,794,562 A * | 8/1998 | Hart .......................... 119/53 |
| 5,875,733 A | 3/1999 | Chen ....................... 119/57.4 |
| 5,884,581 A | 3/1999 | Vandaele .................. 119/52.4 |
| 5,927,232 A | 7/1999 | Pollock ...................... 119/53 |
| 5,941,193 A | 8/1999 | Cole ....................... 119/57.4 |
| 5,957,083 A | 9/1999 | Cheng ..................... 119/57.4 |
| 6,173,676 B1 | 1/2001 | Cole ....................... 119/57.4 |
| 6,349,672 B1 | 2/2002 | Daffi ....................... 119/52.1 |

* cited by examiner

*Primary Examiner*—Charles Jordan
*Assistant Examiner*—Elizabeth Shaw
(74) *Attorney, Agent, or Firm*—Troxell Law Office PLLC

(57) ABSTRACT

A poultry feeder having an adjustment mechanism which adjusts the relative positions between the feeder tower and the feeder bowl to control the amount of feed entering the bowl that is readily adjustable, and, at the same time, enables the feeder bowl, the grill and the adjustment collar to freely rotate relative to the feeder tower to prevent damage to the adjustment mechanism when the grill and/or the bowl is contacted by the feeding birds. A lower edge of an adjusting collar rests on a shoulder portion of the feeder tower when the poultry feeder is suspended above floor level. The relative positions between a bottom of the feeder tower and the feeder bowl is adjustable in a plurality of discreet positions. Each of the plurality of discreet positions provides a different clearance between the bottom of the feeder tower and the bowl, thus controlling the amount of feed which may enter the bowl from the feeder tower.

9 Claims, 6 Drawing Sheets

ADJUSTABLE POULTRY FEEDER

BACKGROUND OF THE INVENTION

The present invention relates to a poultry feeder, more specifically to an adjustable poultry feeder wherein the position of the feeder bowl relative to a feeder tower, or down tube may be readily adjusted to control the amount of feed entering the feeder bowl. The invention also relates to a poultry feeder in which the bowl, the grill and the adjusting collar are all rotatable relative to the feeder tower to prevent damage to the poultry feeder when contacted by the birds during feeding.

Poultry feeding systems are well known in the art, a typical example of which is illustrated in FIG. 1. Such poultry feeding systems typically include a feed supply hopper 10 with a delivery pipe 12 communicating with the bottom of the hopper 10. In known fashion, within the delivery pipe 12 is a helical conveyor, driven by motor 14, which conveys the granular feed from the hopper 10 and into the plurality of poultry feeders 16a–16d. Each of the poultry feeders 16a–16d has a feeder bowl into which the feed passes, and a protective grill that enables the birds to obtain feed from the feeder bowl, but prevents the birds from entering the feeder bowl.

When the birds are very young, the poultry feeders 16a–16d may be located on, or adjacent to the floor (not shown). As the birds mature and grow, the entire feeding system is raised above floor level to enable the birds to readily obtain feed from the feeder bowls. Typically, a series of support wires 18 is used to support the poultry feeder and the entire poultry feeder is raised to a desired level.

It is also known to support the poultry feeders 16a–16d by attaching the feeder tower, or down tube, to the delivery pipe 12, openings in the delivery pipe 12 communicating with a feed tube inlet of the feeder tower. As the feeder system is raised, the relative positions between the feeder tower and the bowl may be increased to increase the amount of feed that may enter the bowl, thereby allowing the mature birds to obtain a greater amount of feed. However, the systems utilized for adjusting the relative positions between the feeder tower and the bowl tend to be overly complex and, therefore, inherently unreliable. The systems also require excessive manual manipulation of the various elements of the feeders, resulting in an excessive amount of time necessary to adjust all of the poultry feeders. Another drawback of the known poultry feeders is that contact of the feeder bowl or grill by the mature birds may cause damage to the adjustment mechanism.

SUMMARY OF THE INVENTION

A poultry feeder is disclosed having an adjustment mechanism which adjusts the relative positions between the feeder tower and the feeder bowl to control the amount of feed entering the bowl that is readily adjustable, and, at the same time, enables the feeder bowl, the grill and the adjustment collar to freely rotate relative to the feeder tower to prevent damage to the adjustment mechanism when the grill and/or the bowl is contacted by the feeding birds.

A lower edge of an adjusting collar rests on a shoulder portion of the feeder tower when the poultry feeder is suspended above floor level. The relative positions between a bottom of the feeder tower and the feeder bowl is adjustable in a plurality of discreet positions. Each of the plurality of discreet positions provides a different clearance between the bottom of the feeder tower and the bowl, thus controlling the amount of feed which may enter the bowl from the feeder tower.

The collar has a plurality of upwardly opening notches formed in an outer surface, which are engaged by at least one protrusion on the hub of the grill. A rim of the grill is attached to a peripheral portion of the bowl. Thus, by positioning the at least one protrusion of the hub of the grill into one of the plurality of upwardly opening notches, the distance between a lower edge of the collar, which rests on a shoulder of the feeder tower, and the bowl may be increased or decreased. This, in turn, increases or decreases the distance between a bottom of the feed tower and the bowl to thereby control the flow of feed into the bowl. In an adjusted position, the collar, the grill and the bowl are freely rotatable relative to the feeder tower.

In order to adjust the feeding position of the feeder, the bowl, grill and collar are manually raised relative to the feeder tower, bringing protrusions on the feeder tower into contact with protrusions on the inner surface of the collar. Such contact in the raised position prevents relative rotation between the collar and the feeding tower. The raised position also disengages the protrusions on the hub of the grill from the notches in the collar, enabling the grill and bowl to be rotated relative to the collar. Such rotation enables the relative positions of the collar and the grill to be changed, thereby enabling the protrusions on the hub of the grill to engage different notches in the collar. Bottoms of adjacent notches are located at different distances from an upper edge of the collar, whereby engagement of the protrusion on the hub of the grill into different notches adjusts the position of the bowl relative to the bottom of the collar.

DETAILED DESCRIPTION OF THE PREFERRED EMBODIMENTS

Figure 1:
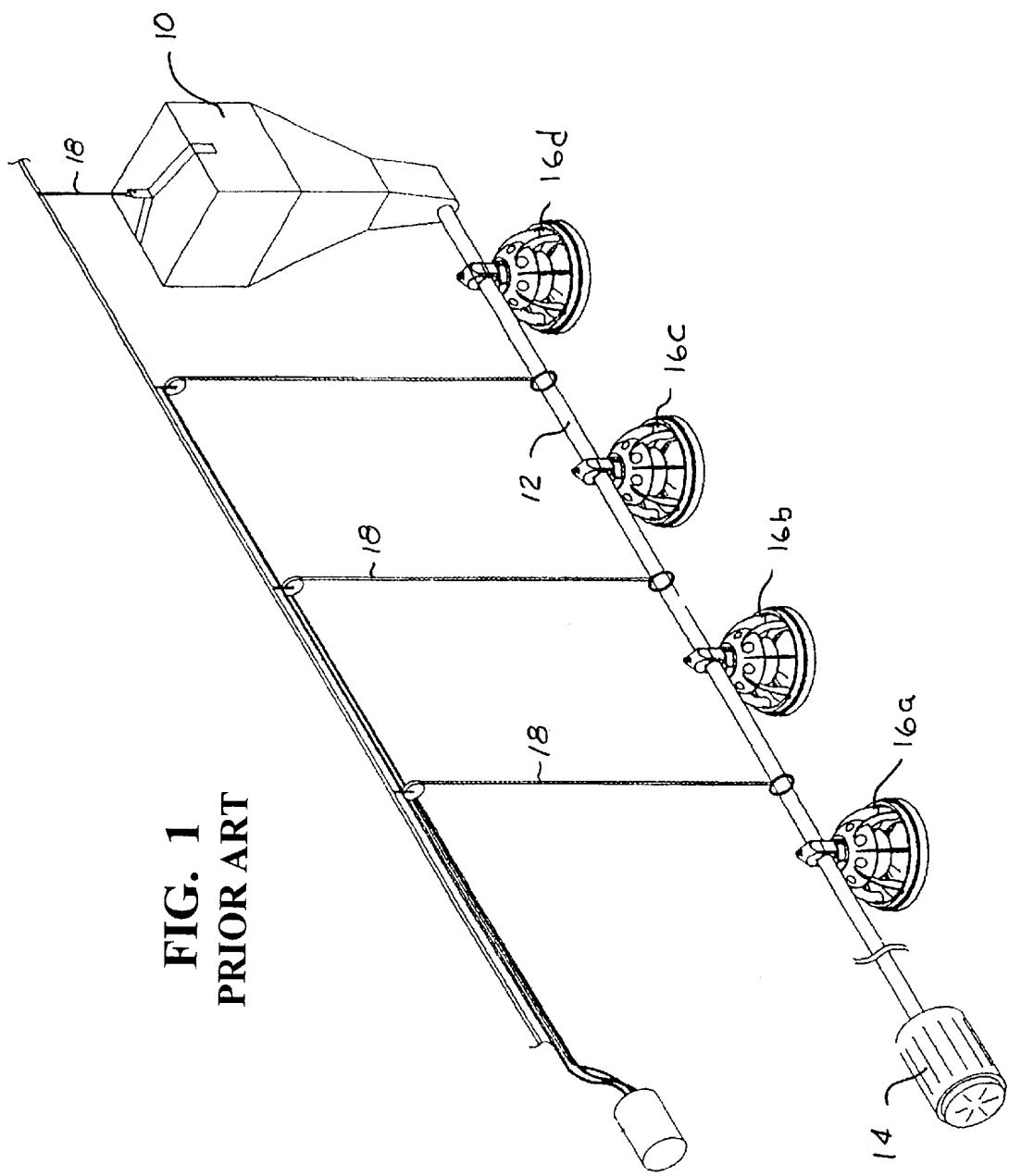
FIG. 1 is a perspective view of a typical poultry feeding system according to the prior art.
Figure 2:
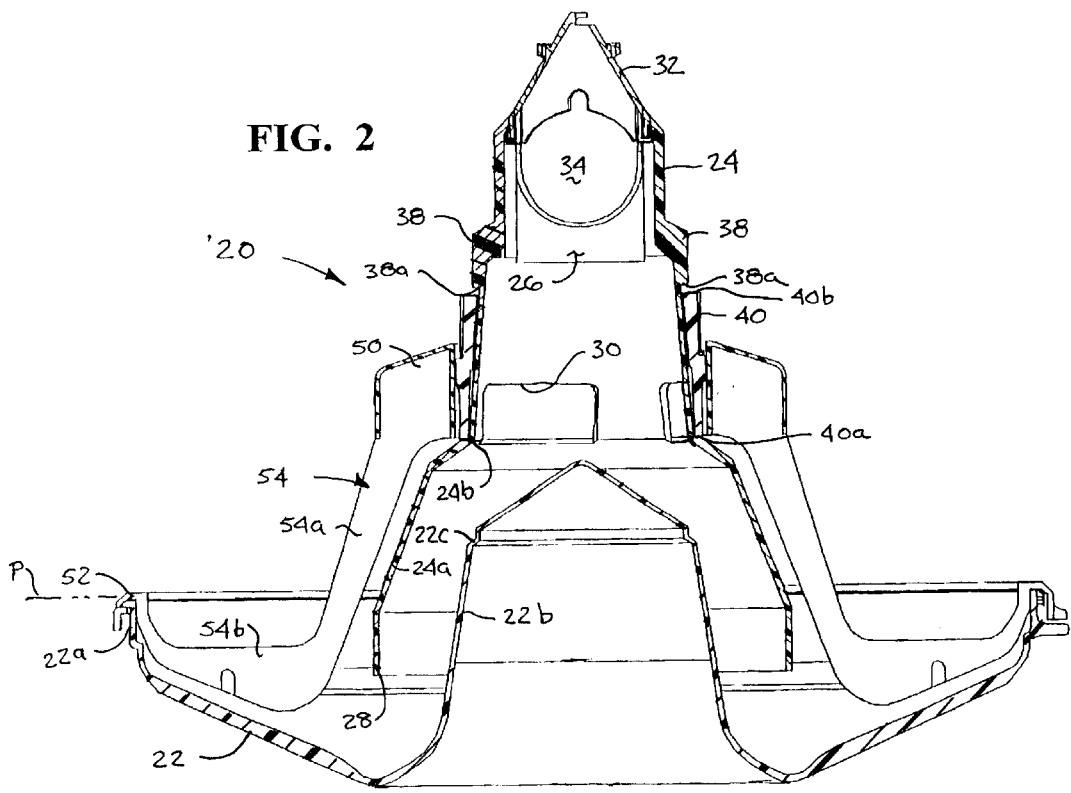
FIG. 2 is a cross-sectional view of the poultry feeder according to the present invention.

FIG. 2 shows a cross-sectional view of the poultry feeder according to the present invention. As illustrated therein, the poultry feeder 20 comprises a feeder bowl 22 having a peripheral portion 22a and a central portion 22b extending upwardly from a bottom of the bowl. A feeder tower 24 has an upper feed inlet 26, an open bottom 28 and at least one lateral feed opening 30 between the upper feed inlet and the open bottom. The feeder tower 24 is shaped such that a lower portion 24a extends around and is spaced from an outer surface of the central portion 22b and has a shoulder 24b which may rest upon a corresponding shoulder 22c of the central portion when the feeder tower is in a lowermost position relative to the feeder bowl. When the feeder tower is in this lowermost position, as is well known in the art, granular feed entering the upper feed inlet 26 will pass into the bowl through one or more of the lateral feed openings 30. Additionally, feed may pass through scallops 22e in the central portion 22b to accurately control the amount of feed entering the bowl. The scallops 22e extend across the shoulder 22c of the central portion 22b. When the feeder tower is adjusted to a position spaced from the bowl 22, as illustrated in FIG. 2, the feed will enter through the upper feed inlet 26 and pass downwardly into the bowl 22 through the space bounded by the outer surface of the central portion 22b and the inner surface of the lower portion 24a.

The upper portion of the feeder tower 24 is attached to the delivery pipe 12 and is retained in this position by releasable cap 32 which engages the uppermost portion of the feeder tower 24, as well as an upper surface of the delivery pipe 12. Delivery pipe 12 will pass through the opening 34 bounded by the cap 32 and the uppermost portion of the feeder tower 24.

Figure 10:
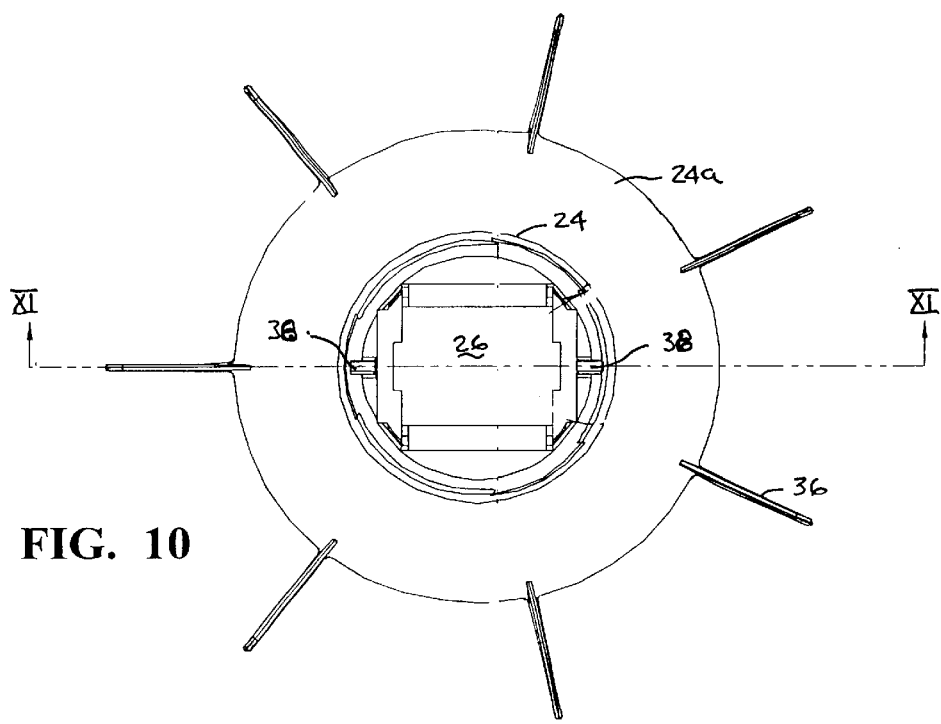
FIG. 10 is a top view of the feeder tower utilized in the poultry feeder according to the present invention.
Figure 11:
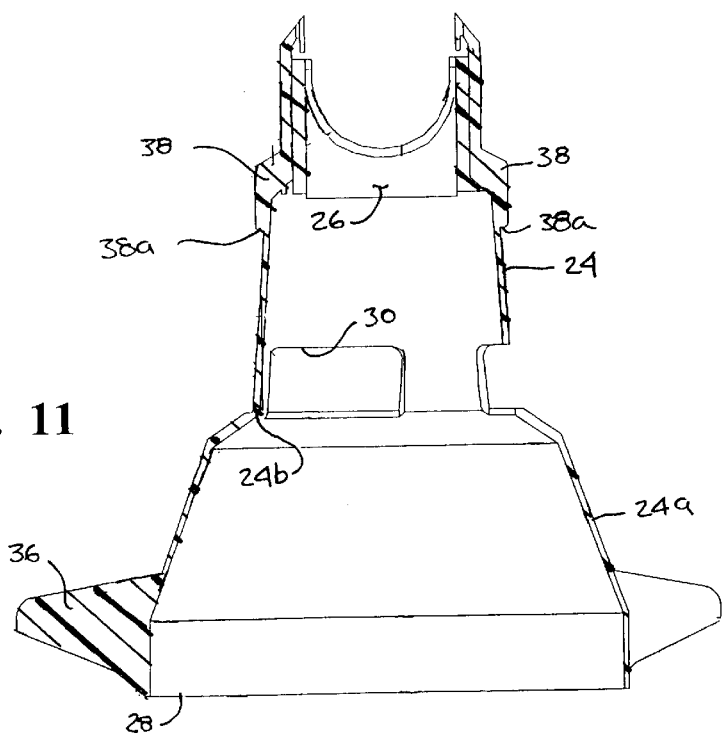
FIG. 11 is a cross-sectional view taken along line XI—XI in FIG. 10.

As best illustrated in FIGS. 10 and 11, the feeder tower 24 may have a plurality of radially outwardly extending fins 36 that are equally spaced apart around the circumference of the lower position 24a. At least one feeder tower protrusion 38 extends outwardly from an upper portion of the feeder tower 24, although two protrusions are illustrated extending from opposite sides of the feeder tower 24. Although two such feeder tower protrusions are illustrated, it is to be understood that one protrusion, or more than two protrusions may be utilized as necessary. At least one such feeder tower protrusion 38 must protrude outwardly from the feeder tower 24. Each of the feeder tower protrusions 38 ends at a lower shoulder portion 38a, the feeder tower protrusions extending generally in an axial direction on the feeder tower 24. As can be seen in the figures, the portion of the feeder tower 24 between the lower shoulders 38a and the shoulder 24b has a relatively smooth outer surface.

Figure 9:
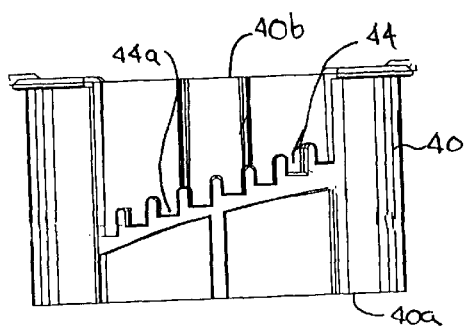
FIG. 9 is a side view of the adjusting collar illustrated in FIG. 8.
Figure 8:
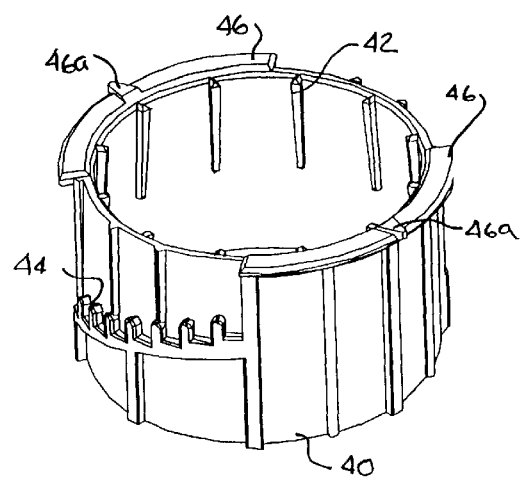
FIG. 8 is a perspective view of the adjusting collar utilized in the poultry feeder according to the present invention.

An adjusting collar 40 is located on the feeder tower 24. The adjusting collar 40, as best illustrated in FIGS. 8 and 9, has a generally cylindrical configuration with a plurality of inward collar protrusions 42 extending inwardly from an inner surface of the collar, such that a diameter of a circle bounded by the innermost surfaces of the inward collar protrusions 42 is less than the transverse dimension between the radially outermost surfaces of the feeder tower protrusions 38. The axial length of the adjusting collar 40 is slightly less than the axial distance between the lowermost shoulder portions 38a of the outward protrusions 38 and the shoulder 24b. When the lowermost edge 40a of the adjusting collar 40 rests on the shoulder 24b of the feeder tower 24, the uppermost edges of the collar protrusions 42 are located below the lowermost shoulders 38a. When in this position, the collar 40 is freely rotatable with respect to the feeder tower 24. However, when the collar 40 is axially displaced upwardly relative to the feeder tower 24, the outward tower protrusions 38 will enter the spaces between the inward collar projections 42 and limit the rotational movement of the collar relative to the tower to the space between adjacent inward collar protrusions 42. Once the inward collar protrusion 42 contacts the outward tower protrusion 38, further rotation of the collar 40 relative to the feeder tower 24 is prohibited.

An outer surface of the adjustment collar has a plurality of upwardly opening notches 44 on opposite sides thereof, as illustrated in FIGS. 8 and 9. Bottoms 44a of adjacent notches 44 are located at different distances between the uppermost edge 40b and the lowermost edge 40a of the adjustment collar 40. Also, the uppermost edge 40b may have one or more flanges 46 extending outwardly therefrom, the flanges having visual indicia 46a thereon, which may be in the form of an arrow, or the like.

Figure 6:
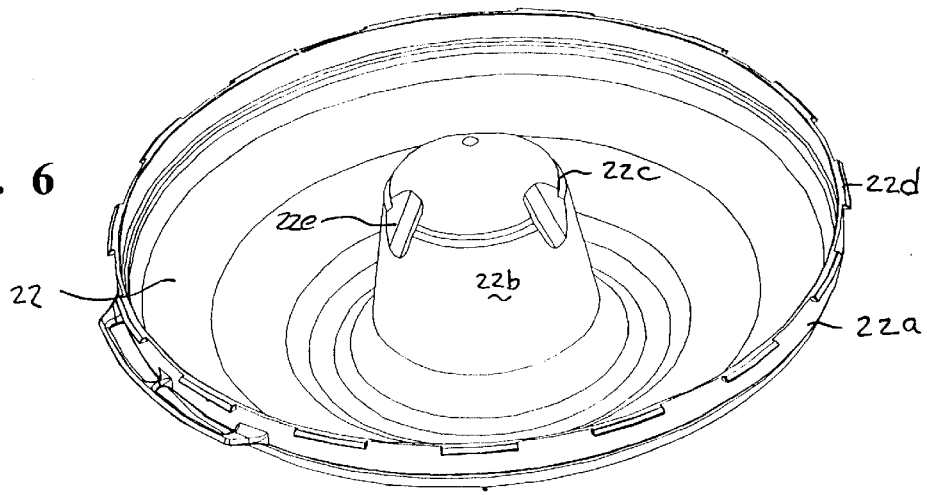
FIG. 6 is a perspective view of the feeder bowl used in the poultry feeder of the present invention.
Figure 7:
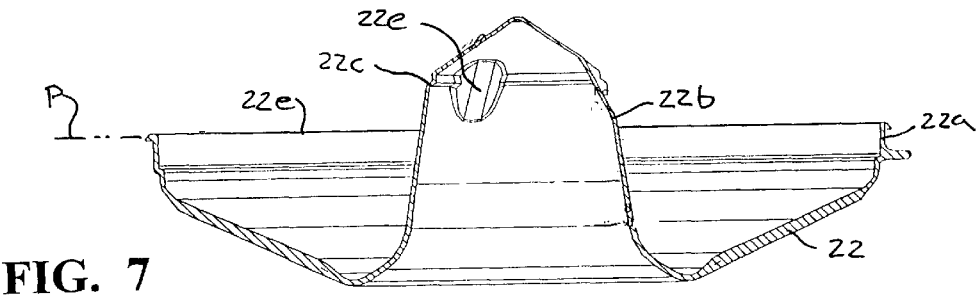
FIG. 7 is a cross-sectional view of the feeder bowl illustrated in FIG. 6.

The feeder bowl 22 is illustrated in more detail in FIGS. 6 and 7. As can be seen, the peripheral portion 22a has a plurality of tabs 22d extending outwardly therefrom, the tabs 22d being circumferentially spaced apart. Bowl 22 has an uppermost edge 22e lying in a plane P.

Figure 3:
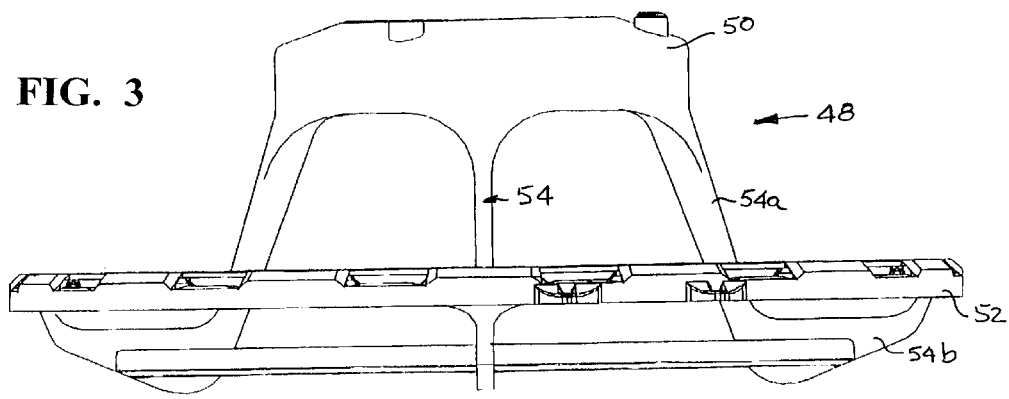
FIG. 3 is a side view of the grill utilized in a first embodiment of the present invention.
Figure 5:
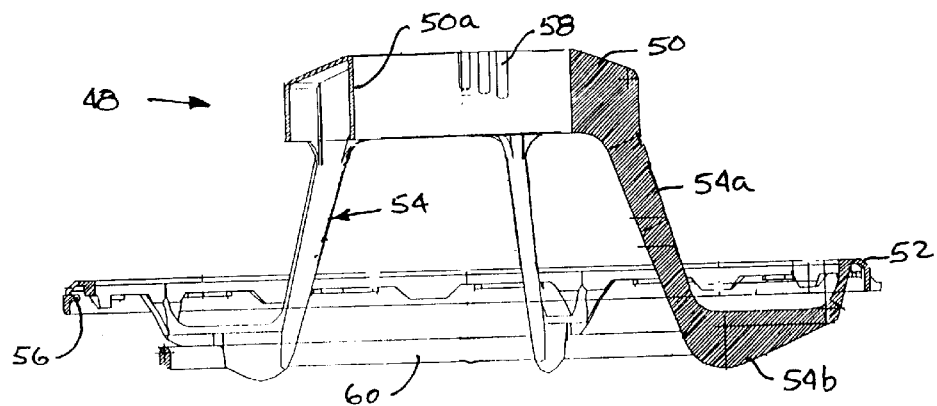
FIG. 5 is a cross-sectional view of the grill taken along line V—V in FIG. 4.
Figure 4:
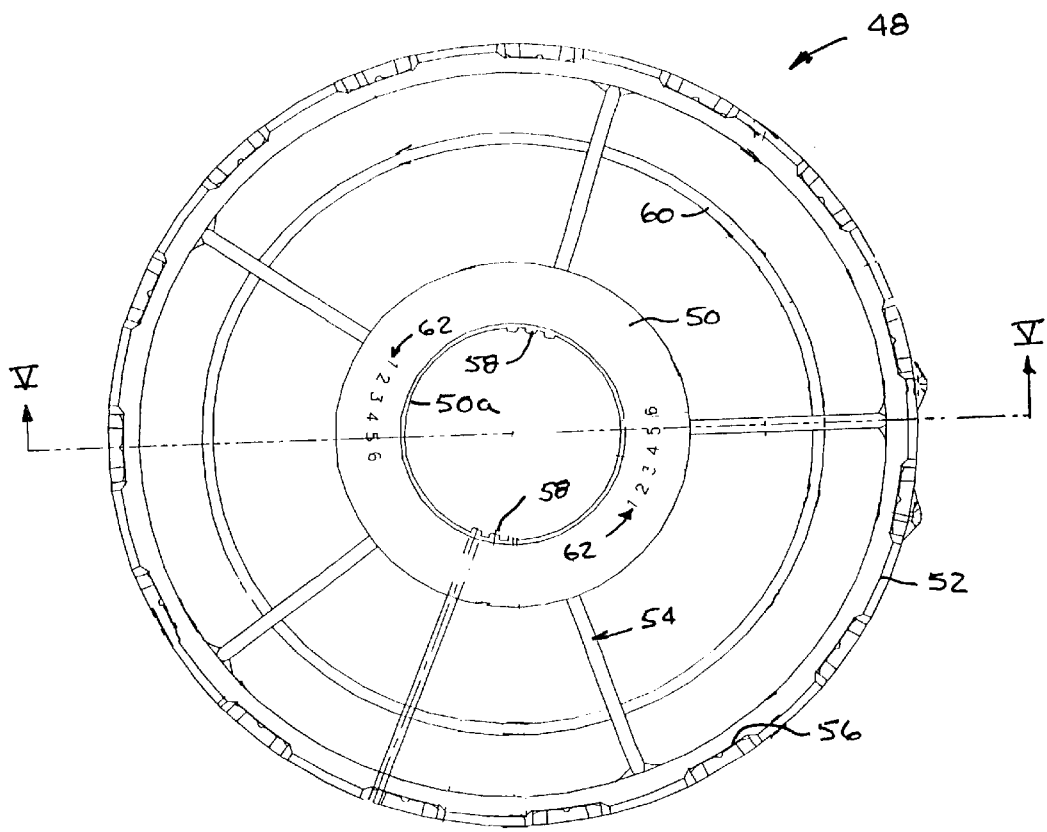
FIG. 4 is a top view of the feeder grill shown in FIG. 3.

A first embodiment of a grill utilized with the present invention is illustrated in FIGS. 3–5. As can be seen therein, the grill 48 comprises a hub 50 having an annular inner surface 50a sized so as to receive the adjustment collar 40 therein. The grill also includes a rim 52 that is releasably attached to the peripheral portion 22a of the feeder bowl 22, and a plurality of circumferentially spaced apart arms 54. In a first embodiment of the grill, each of the plurality of arms 54 comprises a first portion 54a extending downwardly from the hub 50 adjacent to the feeder tower portion 24a (see FIG. 2) and a second portion 54b extending radially outwardly from the first portion 54a to the rim 52. As can be seen in FIG. 2, the outwardly extending portions 54b are located below the plane P of the uppermost edge of the feeder bowl 22. This configuration of the arms enables the birds to feed at 360 degrees around the circumference of the feeder bowl 22. The rim 52 has a plurality of inwardly extending end tabs 56 extending inwardly therefrom and circumferentially spaced apart about the circumference of the rim. The spacings between the adjacent tabs 56 is sufficient to accommodate therebetween the tabs 22d of the bowl 22. Rotation of these elements with respect to one another brings the tabs 56 into contact with the tabs 22d so as to releasably attach the bowl to the grill.

The hub 50 has at least one inwardly extending hub protrusion 58 protruding inwardly from opposite sides of the hub 50, although a plurality of such protrusions 58 are illustrated. The inward hub protrusions are configured so as to engage the notches 44 on the outer surface of the adjusting collar 40. When the inward hub protrusions 58 engage the notches 44 of the adjustment collar 40, relative rotation between these elements is prohibited. Thus, when hub protrusions 58 are engaged with notches 44, the adjustment collar, the grill and the feeder bowl may rotate as a unit with respect to the feeder tower 24, as long as the collar protrusions 42 of the collar 40 are located below the shoulders 38a of the feeder tower protrusions 38. The free rotation of the feeder bowl, the grill and the adjusting collar relative to the tower prevents damage to the feeder and the feed adjusting mechanism when these elements are contacted by mature birds.

The grill 48 may also include a reinforcing ring 60 interconnecting the portions 54b of the arms 54. An upper surface of the hub 50 may have visual indicia 62 thereon located so as to be utilized in conjunction with the visual indicia 46a on the collar 40 to indicate relative positions of grill 48 and the collar 40.

Figure 12:
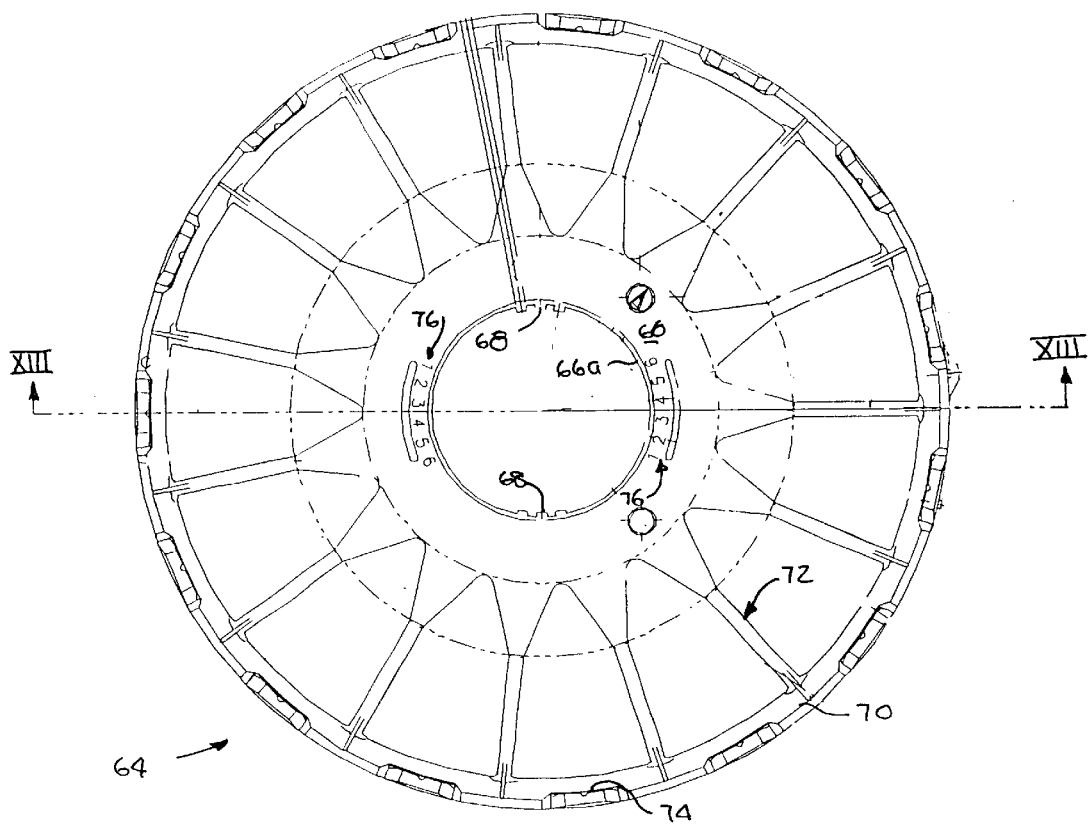
FIG. 12 is a top view of a grill utilized in a second embodiment of the present invention.
Figure 13:
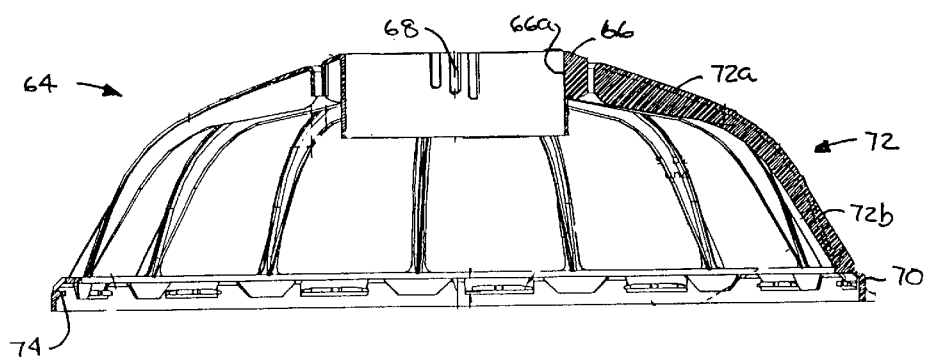
FIG. 13 is a cross-sectional view taken along line XIII—XIII in FIG. 12.

A second embodiment of a grill is illustrated in FIGS. 12 and 13. In this embodiment, the grill 64 includes hub 66 having inner annular surface 66a with at least one inward hub protrusion 68 extending inwardly therefrom. The functions of the hub 66 and the inward hub protrusions 68 are the same as in the previously described embodiment. A rim 70 is connected to the hubs by a plurality of circumferentially spaced apart arms 72. In this particular embodiment, each of the arms 72 has a first section 72a extending generally radially outwardly from the hub 66 and a second portion 72b extending downwardly between the first portion 72a and the rim 70. As in the previously described embodiment, the rim 70 has a plurality of inward, spaced apart tabs 74 that are releasably engageable with the tabs 22d to releasably attach the grill 64 to the feeder bowl 22. Again, indicia 76 may be located on the uppermost surface of the hub 66 to be utilized in conjunction with the indicia 46a on the adjustment collar 40 to indicate the relative positions of the collar and the grill.

In use, as best illustrated in FIG. 2, the feeder 20 will be supported on the delivery pipe (not shown) passing through the opening 34 by the cap 32. Gravity causes the feeder bowl 22, the grill 48, 64 and the collar 40 to be urged downwardly relative to the feeder tower 24. The inward hub protrusions 58, 68 in contact with the bottoms 44a of notches 44 on the collar, will urge the collar 40 downwardly such that lowermost edge 40a is in contact with the shoulder 24b. This will position the bowl 22 relative to the lateral feed openings 30 and to the open bottom 28 of the feeder tower 24 so as to allow a predetermined amount of feed to pass into the feeder bowl 22. When it is desired to adjust the feeder capacity, the feeder bowl 22, the grill 48 and the collar 40 are manually moved upwardly relative to the feeder tower 24 such that the outward tower protrusions 38 move into the spaces between the inward collar protrusions 42. Such upward movement also moves the grill upwardly relative to the collar 40 such that the inward hub protrusions 58, 68 are disengaged from the notches 44. Thus, manual rotation of the grill 48 and bowl 22 will rotate the grill relative to the collar 40, since rotation of the collar 40 is prohibited by the engagement of collar protrusions 42 with outward protrusions 38. Rotation of the grill 48, 64 relative to the collar 40 will enable the inward hub protrusions 58, 68 to engage other notches 44 when the grill is moved downwardly relative to the collar 40. By engaging other notches, when the collar 44 is again moved downwardly such that the lowermost edge 40a contacts the shoulder 24b, will adjust the relative positions between the feeder bowl 22, and the lateral feed openings 30 and the open end 28, so as to adjust the amount of feed passing into the bowl. As can be seen, the adjustment may be readily achieved in a short amount of time without undue effort on the part of the user. Once the elements are in their adjusted positions, the free rotation of the collar 40, the grill 48, 64 and the feeder bowl 22 as a unit relative to the feeder tower 24 will prevent damage to the adjusting mechanism when the grill or the bowl is struck by a mature bird during feeding.

The foregoing description is provided for illustrative purposes only and should not be construed as in any way limiting this invention, the scope of which is defined solely by the appended claims.

What is claimed is:

1. A poultry feeder comprising:

a) a feeder bowl having a peripheral portion and a central portion extending upwardly from a bottom of the bowl;

b) a feeder tower including an upper feed inlet, an open bottom and at least one feed opening between the upper feed inlet and the open bottom;

c) at least one feeder tower protrusion extending outwardly from the feeder tower, the at least one feeder tower protrusion having a shoulder;

d) a collar mounted around the feeder tower, the collar having an outer surface with a plurality of upwardly open, axial notches, bottoms of adjacent notches being at different distances between uppermost and lowermost edges of the collar, at least one collar protrusion extending from the collar toward the feeder tower, the collar being axially movable relative to the tower between a first position, wherein the at least one collar protrusion is axially displaced from the at least one feeder tower protrusion permitting free rotation of the collar relative to the feeder tower, and a second position wherein the at least one collar protrusion contacts the at least one feeder tower protrusion to prevent relative rotation between the collar and the feeder tower; and, e) a grill having a hub through which the collar passes, a rim releasably attached to the peripheral portion of the feeder bowl and a plurality of spaced apart arms extending between the hub and the rim, the hub including at least one hub protrusion releasably engaging one of the plurality of axial notches in the collar, the grill being axially movable relative to the collar between a first position wherein engagement of the at least one hub protrusion with the axial notch of the collar prevents relative rotation between the grill and the collar, and a second position wherein the at least one hub protrusion is disengaged from the axial notches of the collar, thereby permitting relative rotation of the grill relative to the collar, whereby when the collar and grill are in the first positions, the collar, the grill and the bowl may rotate as a unit relative to the feeder tower.

2. The poultry feeder of claim 1 wherein the at least one hub protrusion comprises a plurality of adjacent hub protrusions, each having a different axial length.

3. The poultry feeder of claim 2 wherein the plurality of adjacent hub protrusions are parallel to each other and extend in an axial direction on the hub.

4. The poultry feeder of claim 1 further comprising first visual indicia on the grill adjacent to the collar and second visual indicia on the collar, the first and second visual indicia indicating relative positions of the grill and collar.

5. The poultry feeder of claim 1 further comprising a plurality of first tabs extending from the peripheral portion of the bowl and a plurality of second tabs extending from the rim of the grill, the first and second tabs releasably engaging each other to releasably attach the grill and the bowl together.

6. The poultry feeder of claim 1 wherein each of the plurality of spaced apart arms comprises a first portion extending downwardly from the hub adjacent to the feeder tower, and a second portion extending outwardly from the first portion to the rim.

7. The poultry feeder of claim 6 wherein the second portions of the arms are located below a plane of an uppermost surface of the rim.

8. The poultry feeder of claim 6 wherein the second portions of the arms are located within the bowl.

9. The poultry feeder of claim 1 wherein each of the plurality of spaced apart arms comprises a first portion extending outwardly from the hub and a second portion extending downwardly from the first portion to the rim.

* * * * *